United States Patent [19]

Hahn et al.

[11] Patent Number: 4,973,610
[45] Date of Patent: Nov. 27, 1990

[54] EXPANDABLE STYRENE POLYMERS

[75] Inventors: Klaus Hahn, Kirchheim; Uwe Guhr, Gruenstadt; Hans Hintz, Ludwigshafen; Karl H. Roehrig, Frankenthal, all of Fed. Rep. of Germany

[73] Assignee: BASF Aktiengesellschaft, Ludwigshafen, Fed. Rep. of Germany

[21] Appl. No.: 506,824

[22] Filed: Apr. 10, 1990

[30] Foreign Application Priority Data

Apr. 29, 1989 [DE] Fed. Rep. of Germany ....... 3914292

[51] Int. Cl.$^5$ .............................................. C08J 9/18
[52] U.S. Cl. ....................................... 521/89; 521/56; 521/60; 521/94; 521/98; 521/146; 521/907
[58] Field of Search .................... 521/89, 94, 98, 146, 521/907, 56, 60

[56] References Cited

U.S. PATENT DOCUMENTS 3,565,835  2/1971  Weber et al. .
3,755,209  8/1973  Nintz et al. .
4,029,614  6/1977  Nintz et al. .
4,129,922  12/1978  Law et al. .

Primary Examiner—Morton Foelak
Attorney, Agent, or Firm—Oblon, Spivak, McClelland, Maier & Neustadt

[57] ABSTRACT

Expandable styrene polymers which contain a $C_3$–$C_6$-hydrocarbon as a blowing agent, an organic bromine compound as a flameproofing agent and small amounts of ammonium salt and of an organic amine give, on expansion, foams which have a particularly homogenous foam structure and a good heat insulation effect.

1 Claim, No Drawings

EXPANDABLE STYRENE POLYMERS

The present invention relates to expandable styrene polymers which contain flameproofing agents and on expansion give foams having a homogeneous cell structure with about 5-10 cells per mm.

Foams based on styrene polymers are known to have an optimum heat insulation effect if their cell size corresponds to about 5-15 cells per mm.

In the production of polystyrene foams which contain organic bromine compounds of the flameproofing agent, the said agent also acts as a nucleating agent. Foams of this type therefore have extremely fine cells with a mean cell size of about 15-25. Their heat insulation effect is therefore unsatisfactory. Furthermore, in the production of foam blocks, undesirable shrinkage in the centre of the lateral surfaces of the block is observed.

It is the object of the present invention to provide expandable styrene polymers which contain a flameproofing agent and which on expansion give foams having a homogeneous cell structure with about 5-10 cells per mm. At the same time, the undesirable shrinkage of the foam blocks should be prevented.

We have found, surprisingly, that these objects are achieved by the addition of small amounts of an ammonium salt and certain organic nitrogen compounds.

The present invention thus relates to expandable styrene polymers containing (a) a styrene polymer,
(b) from 3 to 10% by weight of a $C_3$-$C_6$-hydrocarbon as a blowing agent,
(c) from 0.4 to 6% by weight of an organic bromine compound as a flameproofing agent,
(d) from 0.00001 to 0.1% by weight of an ammonium salt,
(e) from 0.001 to 0.1% by weight of an organic amine, selected from the group consisting of
   (e1) amines of the general formula $NR_1R_2R_3$, where $R_1$ is alkyl or cycloalkyl of 4 to 20 carbon atoms or, when $R_2$ and $R_3$ are each H, of 6 to 20 carbon atoms, and $R_2$ and $R_3$ are each H or alkyl or cycloalkyl of 1 to 15 carbon atoms,
   (e2) oxalkylation products of ammonia or of a primary or secondary amine of 1 to 20 carbon atoms and
   (e3) 2,4-diamino-1,3,5-triazines which contain, in the 6-position, alkyl of 1 to 20 carbon atoms in which an H atom in the ω-position may be replaced by 2,4-diamino-1,3,5-triazin-6-yl, or contain cycloalkyl of 5 to 12 carbon atoms or aryl of 6 to 12 carbon atoms, and, if required, (f) conventional additives in effective amounts, the percentages in each case being based on the styrene polymer.

U.S. Pat. No. 3,565,835 discloses expandable styrene polymers which contain from 0.0001 to 1% by weight of ammonium sulfate as a nucleating agent. The foams produced therefrom have extremely fine cells.

U.S. Pat. No. 4,029,614 discloses expandable styrene polymers which contain flameproofing agents and from 0.00001 to 1% by weight of a styrene-soluble amine. The foams produced therefrom have a mean cell number of from 3.4 to 7.4 cells/mm but the foam structure is inhomogeneous.

U.S. Pat. No. 3,755,209 discloses expandable styrene polymers which contain flameproofing agents and small amounts of an oxalkylation product of ammonium or of a primary or secondary aliphatic amine. The foams produced therefrom have an inhomogeneous foam structure.

U.S. Pat. No. 4,129,922 discloses expandable styrene polymers which contain flameproofing agents and small amounts of a substituted 2,4-diamino-1,3,5-triazine. The foams produced therefrom likewise have an inhomogeneous foam structure.

Suitable styrene polymers (a) are polystyrene and copolymers which contain not less than 50% by weight of styrene as polymerized units. Examples of suitable comonomers are α-methylstyrene, styrenes halogenated in the nucleus, styrenes alkylated in the nucleus, acrylonitrile, esters of (meth)acrylic acid with alcohols of 1 to 8 carbon atoms, N-vinyl compounds, such as N-vinylcarbazole, and maleic anhydride. Advantageously, the styrene polymer contains a small amount of a crosslinking agent as polymerized units, i.e. a compound having more than one, preferably two, polymerizable double bonds, such as divinylbenzene, butadiene or butanediol diacrylate. The crosslinking agent is generally used in an amount of from 0.005 to 0.05 mol %, based on styrene. Styrene polymers which contain not less than 5, in general from 5 to 17, preferably from 5 to 10, % by weight of acrylonitrile as polymerized units lead to molding materials which have high oil resistance. Advantageously, the styrene polymer used for this purpose is a mixture of polystyrene and a styrene-soluble styrene/acrylonitrile copolymer, in particular a mixture of from 50 to 83, preferably from 60 to 80, % by weight of polystyrene and from 17 to 50, in particular from 20 to 40, % by weight of a styrene/acrylonitrile copolymer containing about 15-35, in particular 20-30, % by weight of polymerized acrylonitrile.

The molding materials contain, as a blowing agent, from 3 to 10, preferably from 5 to 8, % by weight of a $C_3$-$C_6$-hydrocarbon, such as propane, butane, isobutane, n-pentane, isopentane, neopentane and/or hexane. A commercial pentane mixture is preferably used.

The organic bromine compounds used are the bromine compounds which are usually employed as flameproofing agents, contain in general not less than 2 bromine atoms and have a bromine content of not less than 40% by weight. Suitable bromine compounds are 1,2,3,4-tetrabromobutane, 1,2,4-tribromobutane, tetrabromopentane, bromine-substituted cycloalkanes, such as 1-chloro-2,3,4,5,6-pentabromocyclohexane, 1,2,3,4,5,6-hexabromocyclohexane, 1,2,5,6,9,10-hexabromocyclododecane or octabromocyclohexadecane, dibromoethylbenzene, pentabromodiphenyl ether and esters and acetals of dibromopropanol, such as tris-(2,3-dibromopropyl) phosphate. Hexabromocyclododecane is preferably used.

The organic bromine compound is used in conventional effective amounts of from 0.4 to 6, preferably from 0.5 to 3, % by weight. The molding material should in general have a bromine content of from 0.3 to 5, in particular from 0.5 to 4, preferably from 0.8 to 3, % by weight.

The expandable styrene polymers contain, as additive (d), from 0.00001 to 0.1, preferably from 0.00002 to 0.01, in particular from 0.00005 to 0.005, % by weight of an ammonium salt. Ammonium salts of inorganic acids, such as ammonium chloride, fluoride or bromide or preferably ammonium sulfate or ammonium bicarbonate, are particularly suitable. The ammonium salt is present in the polymers in general as an aqueous solution in the form of very fine droplets. In order to ensure that the desired amount of the salt is present in the polymer, a substantially larger amount of ammonium salt is added to the polymerization salt in the suspension polymerization, since only a very small part of the aqueous phase is included in the polymer. The optimum amount added can readily be determined by preliminary experiments.

Certain organic amines are used as further additive (e), in an amount of from 0.001 to 0.1, preferably from 0.005 to 0.05, in particular from 0.005 to 0.02, % by weight. Amines (e1) of the general formula $NR_1R_2R_3$, where $R_1$ is alkyl or cycloalkyl of 4 to 20 carbon atoms or, if $R_2$ and $R_3$ are each H, of 6 to 20 carbon atoms, and $R_2$ and $R_3$ are each H or alkyl or cycloalkyl of 1 to 15 carbon atoms, are suitable for this purpose. Amines which contain more than 6, in particular 10 or more, carbon atoms, such as n-decylamine, n-dodecylamine, tetradecylamine, dihexylamine, cyclohexylamine or dicyclohexylamine, are preferably used.

Other suitable amines are oxalkylation products (e2) of ammonia or of a primary or secondary amine of 1 to 20 carbon atoms. For the purposes of the present invention, oxalkylation products of ammonia or of primary or secondary amines are the reaction products of ethylene oxide, propylene oxide or higher 1,2-epoxides with ammonia or primary or secondary aliphatic amines, which reaction products are known as mono-, di- or trialkanolamines, and their polyalkylene glycol derivatives formed by further reaction with alkylene oxides. Examples of suitable primary or secondary aliphatic monovalent or polyvalent amines whose substituents are alkyl of 1 to 20, in particular 6 to 20, carbon atoms, aminoalkyl of 2 to 8, in particular 2 to 6, carbon atoms, cycloalkyl radicals having 5 to 7 carbon atoms in the ring, or their alkyl-substituted derivatives having 1 to 20, in particular 1 to 10, carbon atoms in the alkyl substituent, and (secondary) cyclic amines in which the substituents together form an alkylene radical of 4 to 8 carbon atoms which includes the amine nitrogen. For example, the oxalkylation products of ethylamine, propylamine, stearylamine, methyldodecylamine, dibutylamine, piperidine, ethylenediamine or hexamethylenediamine are suitable.

Accordingly, alkanolamines which are suitable according to the invention are, for example, monoalkanolamines, such as N-decylethanolamine, N-methyl-N-stearylethanolamine, N,N-bis-n-dodecylethanolamine, N,N-bis-cyclohexylpropan-2-olamine and N-(2-hydroxyethyl)piperidine as an example of an alkylene oxide derivative of a cyclic aliphatic amine.

Dialkanolamines, such as N,N-bis-(2)-hydroxypropyl-n-dodecylamine or N,N-bis-hydroxyethyl-n-octadecylamine, are also suitable.

Finally, trialkanolamines whose alkylene radicals are sufficiently long to impart a certain degree of solubility in the organic phase of the mixture to be polymerized, for example tri-(N-2-hydroxybutyl)-amine, are suitable.

In the preparation of the novel alkanolamines, polyalkylene glycol derivatives of the amines stated at the outset, having, for example, 2 or 3 alkylene glycol radicals bonded by ether bridges, instead of a hydroxyalkyl group, are also formed as byproducts, as a result of substitution of the hydroxyalkyl groups by further alkylene oxide. These compounds as such are also effective.

Other suitable amines are 2,4-diamino-1,3,5-triazines (e3) which, in the 6-position, contain alkyl of 1 to 20 carbon atoms, in which an H atom in the α-position may be replaced by 2,4-diamino-1,3,5-triazin-6-yl, or contain cycloalkyl of 5 to 12 carbon atoms or aryl of 6 to 12 carbon atoms.

Examples of 2,4-diamino-1,3,5-triazine derivatives used according to the invention are:
6-methyl-2,4-diamino-1,3,5-triazine (acetoguanamine)
6-ethyl-2,4-diamino-1,3,5-triazine (propioguanamine)
6-propyl-2,4-diamino-1,3,5-triazine (butyroguanamine)
6-isopropyl-2,4-diamino-1,3,5-triazine (isobutyroguanamine)
6-nonyl-2,4-diamino-1,3,5-triazine (caprinoguanamine)
6-heptadecyl-2,4-diamino-1,3,5-triazine (palmitinoguanamine)
6-cyclopentyl-2,4-diamino-1,3,5-triazine
6-cyclohexyl-2,4-diamino-1,3,5-triazine
6-cyclohexylmethyl-2,4-diamino-1,3,5-triazine
6-methylcyclohexyl-2,4-diamino-1,3,5-triazine
6-phenyl-2,4-diamino-1,3,5-triazine (benzoguanamine)
6-(3-pyridyl)-2,4-diamino-1,3,5-triazine
6-benzyl-2,4-diamino-1,3,5-triazine (phenylacetoguanamine)
6-toluyl-2,4-diamino-1,3,5-triazine
6-ethyl-2,4-diamino-1,3,5-triazine An example of a 6-alkyl-2,4-diamino-1,3,5-triazine in which an H atom in the α-position of the alkyl group is replaced by 2,4-diamino-1,3,5-triazin-6-yl is succinoguanamine

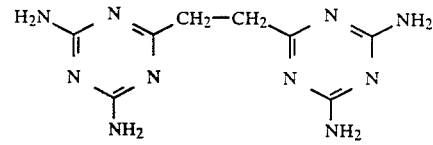

Mixtures of 2 or more of the diaminotriazine derivatives to be used according to the invention may also be employed.

The expandable molding materials may contain, as further additives, conventional colorants, fillers, stabilizers, synergistic agents, nucleating agents, lubricants and the like, in conventional effective amounts.

The expandable styrene polymers are prepared in a known manner by suspension polymerization. For this purpose, styrene, if necessary further copolymers and the additives are polymerized in aqueous suspension, advantageously with the addition of a conventional suspending agent. The blowing agent is initially taken in the polymerization or is added in the course of the polymerization. However, it may also be added to the batch after the polymerization is complete. The resulting expandable bead polymers are then isolated from the aqueous phase, washed and dried.

The expandable styrene polymers are generally in the form of beads. The shape is determined by the preparation by suspension polymerization. The particles are roughly spherical. The beads have a mean diameter of from 0.1 to 6 mm, preferably from 0.2 to 4 mm, in particular from 0.3 to 3 mm.

The expandable molding materials can be expanded in a known manner in conventional expanders using hot air or steam to give bead-like foam particles. The foam beads can be welded in a manner known per se to give moldings by heating in molds which are not gas-tight when closed.

In the Examples, parts are by weight.

EXAMPLES 1 TO 13

A mixture of 150 parts of water, 0.1 part of sodium pyrophosphate, 100 parts of styrene, 0.45 part of benzoyl peroxide, 0.15 part of tert-butyl perbenzoate, 7 parts of pentane and the amounts of flameproofing agents, amines and ammonium salts stated in the Table was heated at 90° C. in a pressure-resistant stirred kettle.

After 2 hours at 90° C., 4 parts of a 10% strength aqueous solution of polyvinylpyrrolidone were added.

Thereafter, stirring was continued for a further 2 hours at 90° C., then for 2 hours at 110° C. and finally for 2 hours at 120° C.

The resulting expandable polystyrene particles were expanded by the action of steam, stored for one day and then welded by further treatment with steam in a closed mold to give foam blocks having a density of 15 kg/cm$^3$.

To evaluate the foam structure, the homogeneity of the cell structure and the number of cells per mm were determined using foam samples which had been cut open.

The results obtained are summarized in the Table.
Examples 1 to 3 and 11 are Comparative Examples.

TABLE

| Example | Hexabromo-cyclododecane (% by weight) | Ammonium sulfate (AS) or ammonium bicarbonate (AB) % by weight in batch | % by weight in polymer | Amine (% by wt.) | Cell number (cells/mm) | Mean cell number (cells/mm) | Cell structure | Coefficient of thermal conductivity DIN 52,612 10° C. (W/°Km) |
|---|---|---|---|---|---|---|---|---|
| 1 | 0.7 | — | — | — | 2–20 | 18 | inhomogeneous | 0.0380 |
| 2 | 0.7 | AS 0.01 | 0.0002 | — | 6–25 | 12 | inhomogeneous | 0.0382 |
| 3 | 0.7 | — | — | A 0.01 | 2–10 | 7 | inhomogeneous | 0.0371 |
| 4 | 0.7 | AS 0.01 | 0.002 | A 0.01 | 8–9 | 8.2 | homogeneous | 0.0365 |
| 5 | 0.7 | AS 0.005 | 0.0001 | A 0.01 | 7–8 | 7.4 | homogeneous | 0.0367 |
| 6 | 0.7 | AS 0.001 | 0.00007 | A 0.01 | 7–8 | 7.5 | homogeneous | 0.0365 |
| 7 | 0.7 | AS 0.0005 | 0.00005 | A 0.01 | 7–8 | 7.4 | homogeneous | 0.0361 |
| 8 | 0.7 | AB 0.001 | 0.00007 | A 0.01 | 8–10 | 9 | homogeneous | 0.0367 |
| 9 | 0.7 | AB 0.0005 | 0.00005 | A 0.01 | 6–8 | 7 | homogeneous | 0.0365 |
| 10 | 0.7 | AS 0.01 | 0.002 | B 0.01 | 8–9 | 8.6 | homogeneous | 0.0364 |
| 11 | 0.7 | — | — | C 0.02 | 3–11 | 7.9 | inhomogeneous | 0.0380 |
| 12 | 0.7 | AS 0.005 | 0.00009 | C 0.02 | 7–8 | 7.6 | homogeneous | 0.0369 |
| 13 | 0.7 | AB 0.001 | 0.00006 | C 0.02 | 8–9 | 8.3 | homogeneous | 0.0368 |

A = N,N-bis-(2-Hydroxyethyl)-octadecylamine (Armostat 400 from Akzo)
B = Di-n-hexylamine
C = 6-Nonyl-2,4-diamino-1,3,5-triazine

We claim:
1. An expandable styrene polymer containing
   (a) a styrene polymer,
   (b) from 3 to 10% by weight of a $C_3$–$C_6$-hydrocarbon as a blowing agent,
   (c) from 0.4 to 6% by weight of an organic bromine compound as a flameproofing agent,
   (d) from 0.00001 to 0.1% by weight of an ammonium salt,
   (e) from 0.001 to 0.1% by weight of an organic amine, selected from the group consisting of
      (e1) amines of the general formula $NR_1R_2R_3$, where $R_1$ is alkyl or cycloalkyl of 4 to 20 carbon atoms or, when $R_2$ and $R_3$ are each H, of 6 to 20 carbon atoms, and $R_2$ and $R_3$ are each H or alkyl or cycloalkyl of 1 to 15 carbon atoms,
      (e2) oxalkylation products of ammonia or of a primary or secondary amine of 1 to 20 carbon atoms and
      (e3) 2,4-diamino-1,3,5-triazines which contain, in the 6-position, alkyl of 1 to 20 carbon atoms in which an H atom in the $\omega$-position may be replaced by 2,4-diamino-1,3,5-triazin-6-yl, or contain cycloalkyl of 5 to 12 carbon atoms or aryl of 6 to 12 carbon atoms, and, if required,
   (f) conventional additives in effective amounts, the percentages in each case being based on the styrene polymer.

* * * * *